Patented Apr. 29, 1941

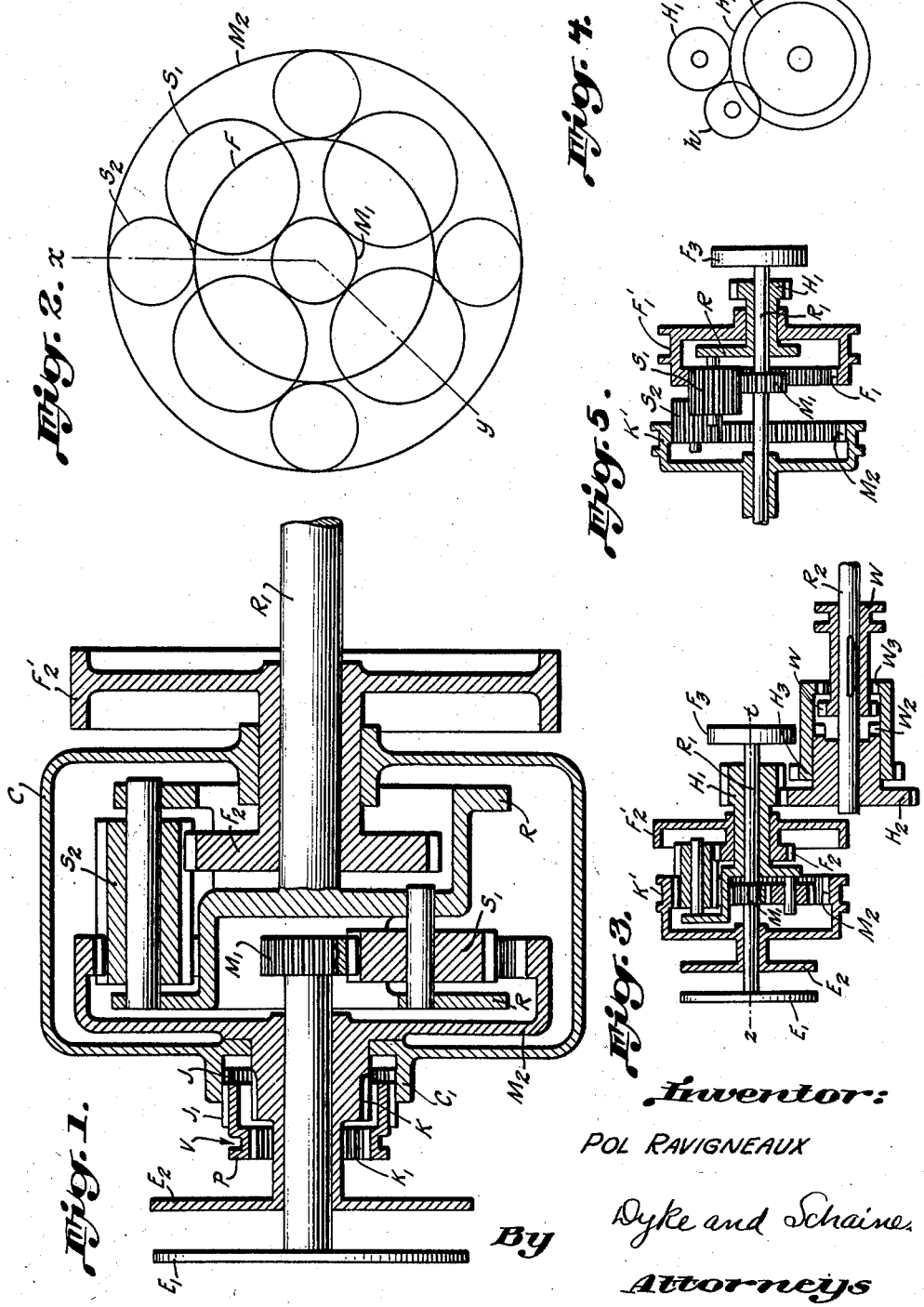

2,239,973

UNITED STATES PATENT OFFICE 2,239,973

VARIABLE SPEED GEAR

Pol Ravigneaux, Neuilly-sur-Seine, France

Application July 7, 1938, Serial No. 217,849
In Luxemburg July 10, 1937

11 Claims. (Cl. 74—276)

The present invention relates to a speed changing device having 3 forward speeds and one reverse speed—in which the 3 forward speeds can be realized by the use of 3 coupling devices, comprising two clutches and a stopping device—and the reverse speed can be realized either by an additional brake or by the action of claws or projections for holding the piece which is adapted for clutching for one of the forward speeds.

This invention has the advantage of comprising a very reduced number of gear wheels, and of occupying a very small space in length.

The device provides for the use of multiple-satellites, thus permitting a reduction of the width of the gear wheels.

Moreover, the whole mechanisms can be contained in a case which forms an extension of one of the parts of the epicyclic assembly, and this permits, with the whole device contained in a housing, to provide apertures in the said case, and to operate the brake in oil, or to provide apertures in the outer housing and to operate the brake in the dry state.

It is also feasible to place the brake at the exterior of the housing.

In the accompanying drawing, by way of example—

Fig. 1 is a longitudinal section of the apparatus, and Fig. 2 a projection of the pitch diameters of the gear wheels.

Fig. 3 shows a modification for 4 speeds with transmission of movement to an intermediate shaft, and a modification of the change of speed, and Fig. 4, a projection of the pitch diameters.

Fig. 5 is a modification of Fig. 3.

In Fig. 1 is represented a complex epicyclic assembly comprising a simple epicyclic assembly consisting of a central wheel such as $F_2$ (provided with stopping means such as a brake drum $F''_2$), a satellite $S_2$ and an internally toothed annulus $M_2$.

The main frame R which carries the shaft of the satellite $S_2$ also carries the shaft of the satellite $S_1$ which engages on the one hand with the satellite $S_2$ and on the other hand with the central wheel $M_1$.

This satellite carrier R is secured to the driven shaft $R_1$.

The clutch members $E_1$ and $E_2$ are respectively connected, the first one to the central wheel $M_1$, and the second to the internally toothed annulus $M_2$, which in turn, may be driving wheels, the selection of the driven part being made by any suitable means.

The annulus $M_2$ comprises a set of teeth such as K, the spaces between the teeth being adapted for the insertion of the projections of a set of teeth $K_1$ formed on a member P whose ribs or flutings $J_1$ are slidable on flutings $J$ formed on an annular part $C_1$ pertaining to the housing C.

The control of the displacement is effected, for instance, by means of a fork acting in a notch V formed in the member P.

Fig. 2 shows the pitch diameters of the above-mentioned wheels. By a suitable choice of the number of teeth, of which an example will be given below, it is possible to use 4 sets of satellites.

The operation is as follows:

The first speed is obtained by clutching the member $E_1$ secured to the central wheel $M_1$ and by holding the other central wheel $F_2$.

The second speed is obtained by causing the annulus $M_2$ to drive, by clutching with the member $E_2$ and by holding the said central wheel $F_2$.

The third speed, which represents the direct drive, is obtained by clutching the members $E_1$ and $E_2$ at the same time, so that the epicyclic assembly will rotate as a whole.

The reverse drive is obtained by clutching the member $E_1$ which is secured to the wheel $M_1$ and by holding the annulus $M_2$.

By way of example, the following ratios can be obtained.

By taking—
$M_1=16$
$M_2=76$
$F_2=40$ which affords a satellite $S_2=18$ and allows for the choice of the number of teeth on the satellite $S_1$; the number of teeth on this latter may be so chosen that when using 4 sets of satellites, there will remain a sufficient play between the satellites $S_1$ and $S_2$ of the different groups.

In the present case, one will use for example $S_1=20$.

Fig. 2, which is practically of full size, shows what will then be the relative mutual positions of the satellites.

These numbers of teeth afford the following ratios:

1st speed _____ 0.28
2nd speed _____ 0.65
3rd speed _____ 1
Reverse drive _____ 0.27

Obviously, these ratios can be varied by changing the number of teeth above mentioned.

The drawing shows a brake drum $F''_2$ which is situated outside of the housing, but it might equally well be placed in the interior of the latter.

For this purpose, it is simply necessary to extend the wheel $F_2$ by an appendage $Q$ which may carry a brake drum $q$, and may eventually make contact with the housing $C$ (or even with the annulus $M_2$), passing through the space $f$ between the said annulus $M_2$ and the housing $C$.

The said appendage of the wheel $F_2$ is shown in Fig. 1 by broken lines.

When the wheel $F_2$ is provided with the above-mentioned appendage, this wall may be apertured, so that the whole device will operate in oil, and even the brake, if this latter is contained in the housing, or on the contrary, the outer housing $C$ may be apertured, and in this case the brake may operate in the dry state.

It will be further observed in Fig. 1 that if it is desired to place the brake $F'_2$ at the exterior of the housing, as here represented, the mechanism might also be enclosed in an extended part of the annulus $M_2$, which may come against the housing on the right-hand side of the figure, i. e., on the side next the driven shaft.

The means by which the annulus $M_2$ is held fast, may vary. Instead of using claws or teeth, use may be made of a brake drum $K'$ or brake disc which is keyed to the said member (Fig. 3).

It is also feasible to replace the holding device shown in Fig. 1 by one or more pawls having the proper direction. For stopping the member $M_2$ when rotating in the direction of action of the engine, such pawls should be brought upon a set of ratchet teeth situated in $K$ or upon a set of ratchet teeth situated for instance at the exterior of the annulus $M_2$, or at any other point on the assembly consisting of the annulus $M_2$ and its connection with the clutch member $E_2$.

Fig. 3 shows in the first place that the same epicyclic device may be used to realize an additional forward speed, when the driven shaft is not situated in line with the driving shaft.

If the movement of rotation of the satellite carrier is transmitted to a shaft which is parallel to the axis $zt$ of the assembly, or is perpendicular, or oblique, for instance, by means of gearing such as $H_1H_2$ whether straight or conical, it is possible to extend, through the satellite carrier, the shaft carrying the wheel $M_1$ and the clutch member $E_1$, and to hold it fast by providing it with a drum $F_3$, for instance.

This will afford a very great increase of speed, by holding this member in position, and by making the annulus $M_2$ a driving part.

The number of teeth above mentioned will afford a great speed value, with the ratio of 1.27 to 1.

Fig. 3 also shows a device which permits, when the movement is transmitted to a shaft which is not in line with the wheel axis $M_1$, of obtaining, not only an additional forward speed as above set forth, but as many reverse speeds as there are forward speeds. This result is obtained by the use of a reversing device located between the driven member (in this case the satellite carrier) and the shaft $R_2$ to be driven.

By operating a member $W$ which is slidable on keys upon the driven shaft $R_2$ and is provided with claws $w$, the said shaft $R_2$ can be connected with the wheel $H_2$ driven by $H_1$, and in certain cases either with the wheel $H_3$ driven by $H_1$ in the contrary direction, by means of the claws $w_2$ and $w_3$.

Between $H_1$ and $H_3$ there will be for instance interposed an intermediate wheel $h$ in order to reverse the direction of rotation of $H_3$ with reference to that of $H_2$, as shown in Fig. 4 which gives the projections of the pitch diameters of the wheels $H_1$, $H_2$, $H_3$ and $h$.

This disposition is compatible with the arrangement for 3 forward speeds without any device for holding on $M_1$, and with the arrangement for 4 forward speeds, one of which has a great speed ratio.

It is possible to eliminate the means for holding the annulus $M_2$, which were used only for the reverse drive, or to leave them in place.

If use is made of a means for holding the annulus $M_2$, for instance by the use of a brake drum $K'$, its action may be combined with the action of the wheels $H_1$, $H_2$, $H_3$, whose number of teeth will be suitably chosen in order to obtain another forward speed.

If for instance we use:

$$H_1 = 20$$
$$H_2 = 80$$
$$H_3 = 63$$

the normal forward speeds, when $H_1$ is engaged with $H_2$, will have the above-mentioned ratios:

0.28
0.65
1.00

By a braking upon $M_2$ which gave a ratio of 0.27, the engaging of the wheels $H_1$ and $H_3$ will afford another ratio in the same sense as the first:

$$\frac{80}{63} \times 0.27 = 0.34$$

In the case in which the extra speed ratio is employed, this will afford 5 positive speeds, which will be definitely arranged as follows:

0.28
0.34
0.65
1.00
1.27

The reverse speeds, of which the 4 highest speeds are obtained by the reversal of the positive speeds, will afford the following ratios, which are compared with the same unity, i. e., in order to obtain the ratio of the total speed reduction, all of the said ratios are to be multiplied by the same fraction $20/80 = 1/4$:

0.27
0.35
0.83
1.27
1.6

The number of teeth which have been chosen for a good series of three speeds may be modified in view of a distribution which is adapted to the number of speeds.

The claws $w$, $w_1$, $w_2$ may be replaced by a double clutch device.

The apparatus herein described may be utilized in the case in which the epicyclic assembly consists of two epicyclic gear sets in which the satellites have their shafts journalled in the same main frame and are in mutual engagement, in which case one of the central wheels will be wanting, instead of one of the annuli is wanting.

Thus the gearing shown in Fig. 5, in which the second annulus which may be held fast is indicated by $F_1$ and carries a drum $F_1$, may afford 4 speeds, comprising the 4th speed whose extra ratio is obtained by holding the shaft carrying the central wheel $M_1$ which may be made a driving wheel.

For the following numbers of teeth:

$M_1=18$ $N_2=84$
$S_1=33$ $S_2=$(as desired)
$F_1=84$ and by the following combinations in which the parts are designated in the order: engine, fixed parts, driven parts, the following ratios will be obtained:

| | | | |
|---|---|---|---|
| $M_1$ | $F_1$ | $R$ | $k_1=0.176$ |
| $M_2$ | $F_1$ | $R$ | $k_2=0.5$ |
| $(M_1M_2)$ | | $R$ | $k_3=1.0$ |
| $M_2$ | $M_1$ | $R$ | $k_4=1.27$ |
| $M_1$ | $M_2$ | $R$ | $k_{AR}=0.27$ |

The device herein described in which a given member of an epicyclic assembly is provided, on the one hand, with a clutch member adapted to connect it with the engine, and on the other hand, with reference to the speed changing, with means for holding in position, is applicable to all speed changing devices of the epicyclic type in which the two members of the assembly may be clutched in turn, one member being secured to a shaft passing through a tube mounted on the other member, the first of the two members being provided, on the side farthest from the engine, with means for holding in position.

This last statement is further applicable in the case in which a reversing device is provided at the forward end of the speed changing device, as well as in the case in which such a device is not provided.

The use of a reversing device is particularly appropriate for vehicles which are required to operate in one direction or the other, such as railway motor vehicles.

I claim:

1. A variable speed gear comprising in combination a driving shaft, a driven shaft and two epicyclic sets, one of said sets comprising at least one planetary pinion and two wheels concentric with said driving shaft and meshing with said pinion, one of said wheels being of the type of a sun wheel, and the other of the type of an annulus, and the other epicyclic set comprising at least one planetary pinion meshing with the planetary pinion of the first set, and only one wheel concentric with said driving shaft and meshing with said pinion of said second set and of the type of one of said wheels of the first mentioned set, a rotatable pinion carrier carrying said planetary pinions and adapted to be operatively connected with said driven shaft, clutching means adapted to connect said driving shaft separately with two of said three wheels, that is, with a sun wheel and with an annulus, and locking means adapted to lock against rotation the third of said three wheels.

2. A change speed gear according to claim 1 in which said clutching means is further adapted to connect the driving shaft simultaneously with said two wheels of different types for direct drive.

3. A change speed gear according to claim 1, in which the sun wheel adapted to be connected with said driving shaft by said clutching means is also provided with brake means, whereby an overdrive speed may be obtained.

4. A variable speed gear comprising in combination a driving shaft, a driven shaft, and an intermediate epicyclic assembly, the assembly comprising a plurality of concentric members, one of which is a sun wheel, another of which is an internal toothed annulus, another of which is a planet carrier carrying a planetary pinion in engagement with the sun wheel and the annulus, which planet carrier carries a second planetary pinion meshing with the first pinion, and another of which is a central toothed wheel in engagement with said second pinion on the planet carrier; clutching means to connect the driving shaft with the central toothed wheel and the annulus, means to operatively connect said planet carrier with the driven shaft, and brake means to hold said sun wheel against rotation.

5. Combination of claim 4, in which the clutching means is further adapted to connect the driving shaft with the sun wheel and the annulus simultaneously for direct drive.

6. Combination of claim 4 in which the annulus is provided also with brake means whereby a reverse speed may be obtained.

7. Combination of claim 4, in which the sun wheel is also provided with brake means whereby an overdrive speed may be obtained.

8. A variable speed gear comprising in combination a driving shaft, a driven shaft, and an intermediate epicyclic assembly, the assembly comprising a plurality of concentric members, one of which is a sun wheel, another of which is an internal toothed annulus, another of which is a planet carrier carrying a planetary pinion in engagement with the sun wheel and the annulus, which planet carrier carries a second planetary pinion meshing with the first pinion, and another of which is an internal toothed annular wheel in engagement with said second pinion on the planet carrier, clutching means adapted to connect the driving shaft with the sun wheel and said annular wheel, means adapted to operatively connect said planet carrier with the driven shaft, and brake means to hold said annulus against rotation.

9. A combination according to claim 8, in which said clutching means is further adapted to connect the driving shaft with said sun wheel and said annular wheel simultaneously for direct drive.

10. A combination according to claim 8, in which said annular wheel is further provided with brake means, whereby a reverse speed may be obtained.

11. A combination according to claim 8, in which the sun wheel is further provided with brake means, whereby an overdrive speed may be obtained.

POL RAVIGNEAUX.